United States Patent
Tomatsu et al.

(10) Patent No.: US 10,556,407 B2
(45) Date of Patent: Feb. 11, 2020

(54) POLYETHYLENE FILM

(71) Applicant: TOYOBO CO., LTD., Osaka-shi, Osaka (JP)

(72) Inventors: Wakato Tomatsu, Inuyama (JP); Hirokazu Ogi, Inuyama (JP); Akira Matsuda, Inuyama (JP)

(73) Assignee: TOYOBO CO., LTD., Osaka-shi (JP)

( * ) Notice: Subject to any disclaimer, the term of this patent is extended or adjusted under 35 U.S.C. 154(b) by 0 days.

(21) Appl. No.: 15/561,727

(22) PCT Filed: Mar. 22, 2016

(86) PCT No.: PCT/JP2016/058929
§ 371 (c)(1),
(2) Date: Sep. 26, 2017

(87) PCT Pub. No.: WO2016/152835
PCT Pub. Date: Sep. 29, 2016

(65) Prior Publication Data
US 2018/0104938 A1 Apr. 19, 2018

(30) Foreign Application Priority Data
Mar. 26, 2015 (JP) .................. 2015-064721

(51) Int. Cl.
*B32B 27/08* (2006.01)
*B32B 27/32* (2006.01)
(Continued)

(52) U.S. Cl.
CPC .............. *B32B 27/08* (2013.01); *B32B 27/18* (2013.01); *B32B 27/304* (2013.01);
(Continued)

(58) Field of Classification Search
CPC ..... B32B 27/32; B32B 27/08; B32B 2307/72; B32B 2323/046; B32B 3/00; B32B 3/30;
(Continued)

(56) References Cited

U.S. PATENT DOCUMENTS

2011/0020637 A1   1/2011  Ikishima et al.
2012/0321887 A1*  12/2012 Uchida ............ B32B 7/06
                                          428/354

FOREIGN PATENT DOCUMENTS

JP    10-86300 A    4/1998
JP    10-251417 A   9/1998
(Continued)

OTHER PUBLICATIONS

International Search Report dated Jun. 28, 2016, issued in Counterpart of International Application No. PCT/JP2016/058929 (2 pages).

(Continued)

*Primary Examiner* — Nancy R Johnson
(74) *Attorney, Agent, or Firm* — Westerman, Hattori, Daniels & Adrian, LLP

(57) ABSTRACT

Provided is a polyethylene film that is more excellent in blocking in unwinding the film in the film roll state, and more excellent in blocking between sealants after lamination with a base material, and also having transparency and excellent heat sealing property even at low temperatures. A polyethylene film wherein in at least either face, a ratio between an arithmetic mean inclination angle in a machine direction of film (RΔa (MD) [°]), and an arithmetic mean inclination angle in a direction perpendicular to the machine direction (RΔa (TD) [°]) satisfies the following formula (1):

$$1.2 \leq R\Delta a(TD)/R\Delta a(MD) \leq 3.6 \quad (1)$$

(RΔa (MD): arithmetic mean inclination angle measured in the machine direction of film, and RΔa (TD): arith-
(Continued)

metic mean inclination angle measured in the direction perpendicular to the machine direction of film).

16 Claims, 1 Drawing Sheet

(51) Int. Cl.
| | |
|---|---|
| *B65D 65/40* | (2006.01) |
| *B32B 27/18* | (2006.01) |
| *B32B 27/30* | (2006.01) |
| *B32B 27/34* | (2006.01) |
| *B32B 27/36* | (2006.01) |
| *B32B 27/40* | (2006.01) |
| *C08L 23/08* | (2006.01) |

(52) U.S. Cl.
CPC .......... *B32B 27/306* (2013.01); *B32B 27/308* (2013.01); *B32B 27/32* (2013.01); *B32B 27/34* (2013.01); *B32B 27/365* (2013.01); *B32B 27/40* (2013.01); *B65D 65/40* (2013.01); *C08L 23/0815* (2013.01)

(58) Field of Classification Search
CPC ... B32B 32/26; B29C 47/8875; B29C 47/065; B29C 47/0021; B29C 47/8845; B29C 47/14; C08L 23/06; C08L 23/04; C08L 2203/162; C08L 2205/02; C08J 5/18; C08J 2423/12; C08J 2323/06; B29K 2105/0094; B29K 2023/0625; B29K 2105/0088; B29K 2509/08; B29K 2105/16; Y10T 428/24355; Y10T 428/24372

See application file for complete search history.

(56) References Cited

FOREIGN PATENT DOCUMENTS

| | | |
|---|---|---|
| JP | 2000-272065 A | 10/2000 |
| JP | 2002-347192 A | 12/2002 |
| JP | 2011-25668 A | 2/2011 |
| JP | 2011-25669 A | 2/2011 |
| JP | 2011-98739 A | 5/2011 |
| JP | 4779822 B2 | 9/2011 |
| JP | 2013-001830 A | 1/2013 |
| JP | 2016-49727 A | 4/2016 |
| WO | 2015/186640 A1 | 12/2015 |

OTHER PUBLICATIONS

Office Action dated Nov. 12, 2019, issued in counterpart JP application No. 2017-508345, with English translation. (14 pages).

\* cited by examiner

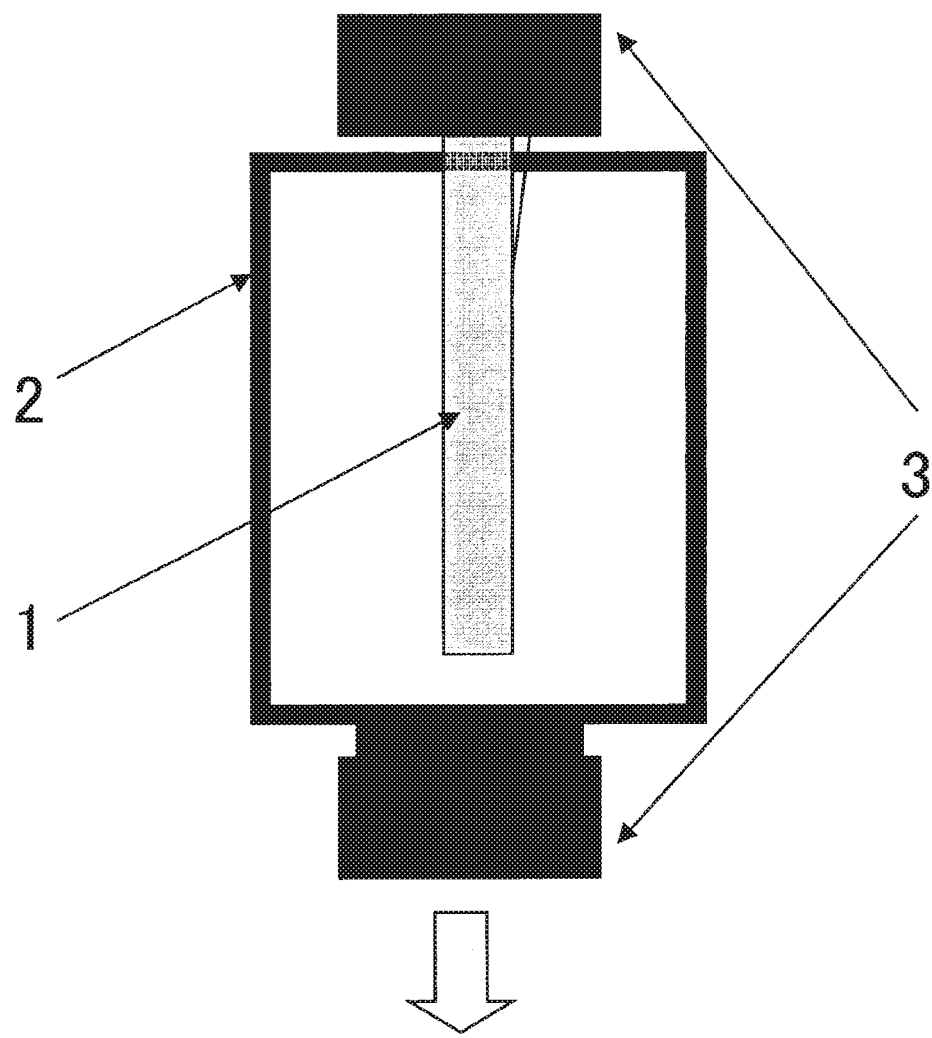

POLYETHYLENE FILM

TECHNICAL FIELD

The present invention relates to a polyethylene film. More specifically, the present invention relates to a polyethylene film having excellent blocking resistance, and heat sealing property at low temperatures, and showing excellent slipperiness even directly after it is unwound from the roll.

BACKGROUND ART

In recent years, packages or containers in which films are used have been used in various fields for the convenience, resource saving, reduction in environmental loads and so on. Films are advantageous in the light weight, easiness of disposal and the low cost, compared with the conventional molded containers and moldings.

In general, a sealant material has been normally used while it is laminated with a base material such as a biaxially oriented nylon film, a biaxially oriented polyester film, a biaxially oriented polypropylene film and the like that are normally inferior to the sealant material in low-temperature heat adhesiveness. However, there has been a case that blocking occurs between the sealant material and the base material after storage following the lamination and the laminate film is difficult to be unwound for a bag producing process, or there has been a case that blocking occurs between sealant materials that are inner sides of the bag in a bag producing process, and foods are difficult to be packed.

For the purpose of ameliorating this situation, there has been known a measure of avoiding blocking between the sealant material and the base material or blocking between the sealant materials by dusting powder of starch or the like on the film surface.

However, this measure not only polluted the periphery of the film processing apparatus, but also caused the problems including significant impairment in the appearance of the packed foods, or direct entry of the powder adhered to the sealant material into the packed body together with the foods, and deterioration in heat sealing strength.

For solving the aforementioned problems, there has been disclosed a laminate polyethylene non-oriented film having the heat sealing property and the blocking resistance in good balance in a polyethylene resin film having the heat sealing property (see, for example, PTD 1).

However, there has been demanded to further improve the blocking resistance between polyethylene films in unwinding the film roll.

CITATION LIST

Patent Document

PTD 1: U.S. Pat. No. 4,779,822

SUMMARY OF INVENTION

Technical Problems

The present invention was devised in light of the aforementioned problems of conventional arts. In other words, it is an object of the present invention to provide a polyethylene film having more excellent blocking resistance in unwinding the film in the film roll state, and more excellent blocking resistance between sealants after lamination with the base material, and also having transparency and excellent heat sealing property even at low temperatures.

Solutions to Problems

As a result of diligent efforts for achieving such an object, the present inventors accomplished the present invention. Specifically, the present invention has the following aspects.

[1]

A polyethylene film wherein in at least either face, a ratio between an arithmetic mean inclination angle in a machine direction of film (R$\Delta$a (MD) [°]), and an arithmetic mean inclination angle in a direction perpendicular to the machine direction (R$\Delta$a (TD) [°]) satisfies the following formula (1):

$$1.2 \leq R\Delta a(TD)/R\Delta a(MD) \leq 3.6 \tag{1}$$

(R$\Delta$a (MD): arithmetic mean inclination angle measured in the machine direction of film, R$\Delta$a (TD): arithmetic mean inclination angle measured in the direction perpendicular to the machine direction of film).

[2] A polyethylene film comprising at least three layers: a sealing layer (A layer), an intermediate layer (B layer), and a laminating layer (C layer), wherein a ratio between an arithmetic mean inclination angle in a machine direction of film (R$\Delta$a (MD)[°]), and an arithmetic mean inclination angle in a direction perpendicular to the machine direction (R$\Delta$a (TD)[°]) of a face of A layer satisfies the following formula (1):

$$1.2 \leq R\Delta a(TD)/R\Delta a(MD) \leq 3.6 \tag{1}$$

(R$\Delta$a (MD): arithmetic mean inclination angle measured in the machine direction of film, R$\Delta$a (TD): arithmetic mean inclination angle measured in the direction perpendicular to the machine direction of film).

[3] The polyethylene film according to aspect 1 or 2, wherein a layer having the face satisfying the formula (1) contains 75 to 97% by weight of a polyethylene resin, and 25 to 3% by weight of a polypropylene resin.

[4] The polyethylene film according to aspect 3, wherein the polyethylene resin is a linear low density polyethylene.

[5] The polyethylene film according to aspect 3 or 4, wherein a melt flow rate (MFR) measured in ASTM D-1238 (230° C., 21.18 N) of the polypropylene resin is 0.6 to 3.0 g/10 minutes.

[6] The polyethylene film according to any one aspects 1 to 5, wherein a heat sealing strength after heat sealing at 120° C. is greater than or equal to 25 N/15 mm.

[7] The polyethylene film according to any one of aspects 1 to 6, wherein a blocking strength is less than or equal to 60 mN/20 mm.

By the aforementioned aspects of the present invention, blocking in unwinding the film from the film roll state is ameliorated. This results from the significant reduction in the contact area when films are overlapped each other, and this feature appears also as the characteristics of excellent slipperiness of the polyethylene film directly after unwinding of the roll of the polyethylene film.

Advantageous Effects of Invention

The polyethylene film of the present invention does not cause roll blocking after winding by itself, and shows excellent slipperiness even directly after unwinding, and shows excellent heat sealing property at low temperatures. Also, even after a lamination process, impairment in slipperiness is small, the opening property at the time of packing is excellent, and the losses for processing is small.

BRIEF DESCRIPTION OF DRAWINGS

FIG. 1 is a view illustrating a method for measuring blocking strength according to an evaluation method of the present invention.

DESCRIPTION OF EMBODIMENTS

Hereinafter, the present invention will be described in detail.

A lower limit of RΔa (TD)/RΔa (MD) calculated from an arithmetic mean inclination angle in the machine direction of film (RΔa (MD)[°]), and an arithmetic mean inclination angle in the direction perpendicular to the machine direction (RΔa (TD) [°]) of at least one face of the film of the present invention is preferably 1.2, more preferably 1.3, further preferably 1.4. If RΔa (TD)/RΔa (MD) is less than 1.2, blocking can occur when the film is in a roll state or after bag production.

An upper limit of RΔa (TD)/RΔa (MD) is preferably 3.0, more preferably 2.7, further preferably 2.5. If RΔa (TD)/RΔa (MD) exceeds 3.0, the transparency can be impaired.

RΔa (MD): arithmetic mean inclination angle measured in the machine direction of film, RΔa (TD): arithmetic mean inclination angle measured in the direction perpendicular to the machine direction of film An arithmetic mean inclination angle (RΔa (MD) [°]) and an arithmetic mean inclination angle (RΔa (TD) [°]) were measured in the following manner.

First, an image was taken in any selected site on the sealing layer (A layer) side of the film using a profile measuring laser microscope (model VK-9700, available from KEYENCE CORPORATION) (magnification: 50 times).

Then the image was measured for surface roughness (line roughness) using roughness analyzing software (VK Analyzer, available from KEYENCE CORPORATION).

The surface roughness (line roughness) was measured on the basis of JIS-B0601, with a cutoff of λc=0.08 mm, an analyzing length in the MD direction of 200 μm an, an analyzing interval in the TD direction of 3.3 μm, and n=60. For each surface roughness (line roughness) curve, an arithmetic mean inclination angle was calculated according to the JISB0601:2001 method at a measurement pitch of 0.01 μm, and the mean was determined as an arithmetic mean inclination angle (RΔa (MD) [°]).

Also, an arithmetic mean inclination angle (RΔa (TD) [°]) was measured in the same manner with an analyzing length in the TD direction of 200 μm, and an analyzing interval in the MD direction of 3.3 μm.

An upper limit of RΔa (MD) is preferably 0.9, more preferably 0.7. A lower limit of RΔa (MD) is preferably 0.2, more preferably 0.4. An upper limit of RΔa (TD) is preferably 1.4 more preferably 1.2. A lower limit of RΔa (TD) is preferably 0.6, more preferably 0.8.

In the present invention, by employing the range of the above formula (1), the film surface has such a form that ridgy bumps and dips like a washboard are present entirely in the MD direction, and a crest of a projection protrudes at several points of the form. It was found that this significantly reduces the contact area when the films are overlapped, and prevents blocking, and also improves the slipperiness.

The term "blocking" used herein means a phenomenon that a part where the back face and the front face of the film contact with each other fails to smoothly separate from each other in unwinding of the film from the roll state.

It was also found that when an attempt is made, as a conventional method, to reduce the contact area by forming projections on the film surface by adding an anti-blocking agent and an organic lubricant, and to improve the slipperiness by covering the surface in the part other than the projections with the organic lubricant, the films of the part where the anti-blocking agent is absent adhere to each other in the roll state, and the organic lubricant is less likely to bleed out on the film surface.

It was also found that when an attempt is made to improve the slipperiness by adding a certain degree of amount of an organic lubricant to the polyethylene film as disclosed in PTD1, the amount of the organic lubricant bleeding out to the film surface is small during storage of the film in the roll state, and the organic lubricant of the superficial layer enters inside in unwinding the film from the roll, so that substantially a sufficient organic lubricant is not present on the surface of the polyethylene film, and thus the slipperiness is not satisfactory.

It is supposed that in the film that is stored in the roll state, film surfaces closely adhere to each other to hinder the bleeding out of the organic lubricant. The effect increases when the contacting surfaces have the same resin composition. In the present invention, a polypropylene resin is added to the sealing layer, and the resin compositions are slightly different between the contacting surfaces in the roll state. Therefore, close adhesion between superficial layers is less likely to occur, and thus the organic lubricant in the sealing layer would be more likely to reside on the superficial layer of the sealing layer.

The methods for achieving the range of the above formula (I) are as follows.

For example, when two or more material resins having different melt flow rates (MFR), for example, a polyethylene resin and a polypropylene resin are blended and melted, the resins are in a uniformly mixed condition where they are finely dispersed from each other. At this time, if these resins are highly miscible, they behave as if they melted together, whereas if these resins are poorly miscible, the these resins completely separate from each other, and the particle sizes of the these resins are large.

When these resins have different melt flow rates (MFR), and the melt flow rates (MFR) respectively fall within specific ranges, they can form a finely dispersed condition.

Further, for example, the polypropylene resin which has come into a finely dispersed condition in an extruder is stretched in the draft when it is pulled onto the cooling roll from the T die, and turns into fine bumps and dips accompanied by ridges in the machine direction of film (MD).

It was found that in the invention of the present application, even when polypropylene resin is added to polyethylene resin, the low temperature sealing property is not unexpectedly impaired, and slipperiness is improved.

As the polyethylene resin to be used, for example, one or a mixture of two or more kinds selected from ethylene•α-olefin copolymers, and high-pressure-processed polyethylenes can be recited. The ethylene•α-olefin copolymer is a copolymer of ethylene and an α-olefin having 4 to 18 carbons, and examples of α-olefin include buthene-1, hexene-1, 4-methylpentene-1, octene-1, decene-1 and so on. The films obtained from these polyethylene resins have excellent heat sealing strength, and have a sealing strength even when the sealant resin is in a melt condition directly after sealing, to have such a property that the sealing part does not peel under a pressure impact at the time of filling with the content (hot tack property), and have such a property that the sealing property is less likely to deteriorate and close sealing can be achieved safely when a liquid, a viscous substance, powder or the like content adheres to the sealing part during packaging (foreign matter sealing property), and have impact resistance. The polyethylene resin may be mixed with other resin such as ethylene•vinyl acetate copolymer, ethylene•acrylate ester copolymer and the like as long as these properties are not hindered.

Among these, as the polyethylene resin to be used in the present invention, those having a melt flow rate (hereinafter, also referred to as MFR) of about 2.5 to 4.5 g/minute are preferred from the view points of the film forming property, physical properties and functionality of the formed film. Here, MFR was measured in accordance with ASTM D1238. Also, the polyethylene resin can be synthesized by a method that is known per se.

In the present invention, the range of the density of the material polyethylene resin to be used in mixture is not particularly limited, but is preferably 900 to 970 $kg/m^3$, more preferably 905 to 965 $kg/m^3$, further preferably 910 to 960 $kg/m^3$. A polyethylene resin having a density of greater than or equal to 900 $kg/m^3$ is easy to handle. A polyethylene resin having a density of less than or equal to 970 $kg/m^3$ is easy to polymerize.

A molecular weight distribution (Mw/Mn) of the polyethylene resin to be used in mixture is preferably 2.0 to 3.5, more preferably 2.2 to 3.3, further preferably 2.4 to 3.1. When a polyethylene resin having a molecular weight distribution (Mw/Mn) of greater than or equal to 2.0 is used, neck-in or the like due to fluidity of the resin in a molten state is less likely to occur, and stable production in manufacturing films is facilitated. This leads to reduction in unevenness of thickness of the film. When a polyethylene resin having a molecular weight distribution of less than or equal to 3.5 is used, generation of fish-eye caused by a high molecular weight body is reduced.

The polypropylene resin to be used is preferably a polypropylene random copolymer, more preferably a random copolymer (polypropylene-α-olefin random copolymer) of a large amount (approximately greater than or equal to 85% by weight) of propylene and a small amount (approximately less than or equal to 15% by weight) of α-olefin. As an α-olefin monomer for obtaining such a polypropylene random copolymer, ethylene, butene-1, pentene-1, 4-methyl-pentene-1, hexane-1, octene-1 or the like can be used. However, from the aspect of the productivity, it is particularly preferred to use ethylene or butene-1. As the α-olefin to be used in copolymerization, at least one kind can be used, and two or more kinds can be mixed and used as necessary.

A lower limit of the density of the polypropylene resin is preferably 870 $kg/cm^3$, more preferably 885 $kg/cm^3$. When the density is less than the lower limit, polypropylene is perfectly immiscible, and whitening of the film can occur. An upper limit of the density of the polypropylene resin to be added to the sealing layer is preferably 920 $kg/cm^3$, more preferably 900 $kg/cm^3$. When the density is less than or equal to 920 $kg/cm^3$, the polypropylene is difficult to be perfectly miscible with the polyethylene resin, and bumps and dips are likely to appear on the superficial face of the sealing layer.

A lower limit of the melt flow rate (MFR) of the polypropylene resin is preferably 0.6 g/10 minutes, more preferably 1.0 g/10 minutes, further preferably 1.2 g/10 minutes. When the MFR is greater than or equal to 0.6 g/10 minutes, miscibility between the polypropylene and the polyethylene resin is improved, and whitening of the film is less likely to occur.

An upper limit of the melt flow rate of the polypropylene resin is preferably 3.0 g/10 minutes, more preferably 2.0 g/10 minutes, further preferably 1.7 g/10 minutes. When the MFR is greater than this upper limit, the polypropylene is perfectly miscible with the polyethylene resin, and bumps and dips cannot appear on the superficial face of the sealing layer.

A lower limit of the adding amount of the polypropylene resin, relative to the entire mixture of the polyethylene resin and the polypropylene resin is preferably 3% by weight, more preferably 8% by weight, further preferably 10% by weight. When the adding amount is greater than or equal to 3% by weight, blocking is less likely to occur, and the slipperiness directly after unwinding is less likely to impair. An upper limit of the adding amount of the polypropylene resin in the sealing layer is preferably 25% by weight, more preferably 15% by weight, and the low-temperature sealing property is excellent when the adding amount is less than or equal to 25% by weight.

In U.S. Pat. No. 4,411,960, 2.0% by weight of a high-density polyethylene resin is added to the polypropylene resin, however, bumps and dips do not appear on the superficial face of the sealing layer as described above only by addition of 2% by weight to the polyethylene resin serving as a base.

In the present invention, an anti-blocking agent may be contained. While the anti-blocking agent may be one kind, using a mixture of two or more kinds of inorganic particles having different particle sizes and forms makes it possible to form complicated projections in the bumps and dips of the film surface, and to obtain a higher blocking preventing effect.

In the present invention, it is preferred to add inorganic particles as the anti-blocking agent. By this, it is possible to maintain the low-temperature sealing property, and give a high blocking preventing effect. This is ascribable to that mixing the inorganic particles results in formation of projections on the film surface to reduce the contact area of the film, and thus the blocking preventing effect is obtained.

In the present invention, while the composition and the combination of the inorganic particles to be used as the anti-blocking agent are not limited, silica, zeolite, diatomite, talc and the like can be used. Preferably, a mixture of silica and zeolite can be used. Further, those having non-porous surface and narrow particle size distribution are preferred. This is because when the surface is porous, the film foams and the appearance thereof can be impaired under the influence of the water adsorbed to the inorganic particles.

For the purpose of complicating the surface form, those having different particle sizes can be used to make them play respective roles. When the particle size distribution is wide, the inorganic particles can build up on the lip part of the T die to interfere with productivity in production of the film.

A lower limit of the particle size of the anti-blocking agent is preferably 3 µm. When the particle size of the anti-blocking agent is greater than or equal to 3 µm, blocking is ameliorated more easily.

An upper limit of the particle size of the anti-blocking agent is preferably 20 µm, more preferably 16 µm. When the particle size of the anti-blocking agent is less than or equal to 20 µm, the transparency of the film is maintained more easily.

A lower limit of the total concentration of anti-blocking agents is preferably 0.1% by weight, more preferably 0.5% by weight, further preferably 0.8% by weight. When the total concentration of anti-blocking agents is greater than or equal to 0.1% by weight, slipperiness is obtained more easily.

An upper limit of the total concentration of anti-blocking agents is preferably 5% by weight, more preferably 3% by weight, further preferably 2% by weight. When the total concentration of anti-blocking agents is less than or equal to 5% by weight, the film is not too slippery, and winding misalignment is less likely to be caused.

A lower limit of the three-dimensional arithmetic mean roughness SRa of the film surface satisfying the foregoing formula (1) is preferably 0.05 μm, more preferably 0.08 μm, further preferably 0.10 μm. When the three-dimensional arithmetic mean roughness SRa is greater than or equal to 0.05 μm, blocking is less likely to occur in the roll state or after production of bags.

An upper limit of the three-dimensional arithmetic mean roughness SRa is preferably 0.25 μm, more preferably 0.2 μm. When the three-dimensional arithmetic mean roughness SRa is less than or equal to 0.25 μm, the effect of increase in surface roughness on the blocking resistance increases.

In the present invention, it is preferred to add an organic lubricant. This improves the lubricity of the laminate film and the blocking preventing effect, and improves the handleability of the film. This is ascribable to the fact that the organic lubricant having bled out and present on the film surface leads the emergence of the lubricating effect or the mold releasing effect. Further, as the organic lubricant, it is preferred to add those having a melting point higher than or equal to normal temperatures. As the organic lubricant, fatty acid amides, and fatty acid esters can be recited. Concrete examples include oleic amide, erucic amide, behenic amide, ethylene bisoleic amide, hexamethylene bisoleic amide, and ethylene bisoleic amide. These may be used solely, however, a combination of two or more kinds is preferably used because the lubricity and the blocking preventing effect can be maintained even in severe environments.

A lower limit of the organic lubricant amide group concentration of the sealing layer (A layer) is preferably 600 ppm by weight, more preferably 800 ppm by weight. When the organic lubricant amide group concentration is greater than or equal to 600 ppm by weight, slipperiness is easy to be obtained. An upper limit of the organic lubricant amide group concentration is 2000 ppm by weight, more preferably 1500 ppm by weight. When the organic lubricant amide group concentration is less than or equal to 2000 ppm by weight, excessive slipping does not occur, and winding misalignment is less likely to be caused.

The polyethylene film of the present invention may contain appropriate amounts of a heat stabilizer, an antioxidant, an antistatic agent, an anti-fogging agent, a neutralizer, a lubricant, a nucleating agent, a coloring agent, and other additives and inorganic fillers and so on in any layer as necessary to the extent that the object of the present invention is not interfered.

Preferably, an antioxidant is mixed in the polyethylene resin, and combination of a phenol antioxidant and a phosphite antioxidant, or a single antioxidant having a phenol backbone and a phosphite backbone in one molecule may be used.

A lower limit of the film thickness is preferably 10 μm, more preferably 30 further preferably 35 μm. When the film thickness is greater than or equal to 10 the stiffness is not too weak, and the processability is excellent. An upper limit of the film thickness is 100 μm, more preferably 50 μm, further preferably 40 μm. When the film thickness is less than or equal to 100 μm the film is not too stiff and is easy to process.

Examples of the forming method of the polyethylene film of the present invention include, but are not limited to, an inflation method, and a T die method, and the T die method is preferred for improving the transparency and for easiness of drafting. Since the T die method uses a cooling roll in contrast to the inflation method which uses air as the cooling medium, the T die method is an advantageous production method for elevating the cooling speed.

The melt-molded film is preferably wound up as a roll. The winding length is not particularly limited, however, an upper limit is preferably 8000 m. When the winding length is less than or equal to 8000 m, the weight does not excessively increase, and handling is easy. A lower limit is preferably 100 m. When the winding length is less than or equal to 100 m, the efficiency of processing does not deteriorate.

(Laminate Film)

The polyethylene film of the present invention may be configured to include at least a sealing layer (A layer), an intermediate layer (B layer), and a laminating layer (C layer) in this sequence. The outermost layers are A layer and C layer. At this time, it is necessary that a face of the sealing layer (A layer) satisfies the following formula (1):

$$1.2 \leq R\Delta a(TD)/R\Delta a(MD) \leq 3.6 \quad (1)$$

(RΔa (MD): arithmetic mean inclination angle measured in the machine direction of film RΔa (TD): arithmetic mean inclination angle measured perpendicularly to the machine direction of film).

Resins to be used in the sealing layer (A layer) of the film of the present invention are as follows.

As a polyethylene resin to be used, for example, one or a mixture of two or more kind selected from ethylene•α-olefin copolymers, and high-pressure-processed polyethylenes can be recited. The ethylene•α-olefin copolymer is a copolymer of ethylene and an α-olefin having 4 to 18 carbons, and examples of α-olefin include buthene-1, hexene-1, 4-methylpentene-1, octene-1, decene-1 and so on. The films obtained from these polyethylene resins have excellent heat sealing strength, hot tack property, foreign matter sealing property, and impact resistance, and the polyethylene resin may be mixed with other resin such as ethylene•vinyl acetate copolymer, ethylene•acrylate ester copolymer and the like as long as these properties are not hindered.

Among these, as the polyethylene resin to be used in the present invention, those having a melt flow rate (hereinafter, also referred to as MFR) of about 2.5 to 4.5 g/minute are preferred from the view points of the film forming property, physical properties and functionality of the formed film. Here, MFR was measured in accordance with ASTM D-1238 (230° C., 21.18 N). Also, the polyethylene resin can be synthesized by a method that is known per se.

In the present invention, the range of the density of the material polyethylene resin to be used in mixture is more preferably 905 to 965 kg/m³, further preferably 910 to 960 kg/m³. A polyethylene resin having a density of smaller than 900 kg/m³ itself has poor handleability. A polyethylene resin having a density of larger than 970 kg/m³ is disadvantageous because it is difficult to be obtained due to difficulty in polymerization.

A molecular weight distribution (Mw/Mn) of the polyethylene resin to be used in mixture is preferably 2.0 to 3.5, more preferably 2.2 to 3.3, further preferably 2.4 to 3.1. When a polyethylene resin having a molecular weight distribution (Mw/Mn) of greater than or equal to 2.0 is used, neck-in or the like due to the flow characteristics of the resin when it melts is less likely to occur, and stable production in manufacturing films is facilitated. This leads to reduction in unevenness of thickness of the film. When a polyethylene resin having a molecular weight distribution of less than or equal to 3.5 is used, generation of fish-eye caused by a high molecular weight body is reduced.

The polypropylene resin to be used is preferably a polypropylene random copolymer, more preferably a random copolymer (polypropylene-α-olefin random copolymer) of a large amount (approximately greater than or equal to 85% by weight) of propylene and a small amount (approximately less than or equal to 15% by weight) of α-olefin. As an α-olefin monomer for obtaining such a polypropylene random copolymer, ethylene, butene-1, pentene-1, 4-methylpentene-1, hexane-1, octene-1 or the like can be used. However, from the aspect of the productivity, it is particularly preferred to use ethylene or butene-1. As the α-olefin to be used in copolymerization, at least one kind can be used, and two or more kinds can be mixed and used as necessary.

A lower limit of the density of the polypropylene resin is preferably 870 kg/cm$^3$, more preferably 885 kg/cm$^3$. When the density is greater than 870 kg/cm$^3$, the polypropylene is likely to be miscible with the polyethylene resin, and whitening of the film is less likely to occur. An upper limit of the density of the polypropylene resin to be added to the sealing layer is preferably 920 kg/cm$^3$, more preferably 900 kg/cm$^3$. When the density is less than or equal to 920 kg/cm$^3$, the polypropylene is difficult to be perfectly miscible with the polyethylene resin, and bumps and dips are likely to appear on the superficial face of the sealing layer.

A lower limit of the melt flow rate (MFR) of the polypropylene resin is preferably 0.6 g/10 minutes, more preferably 1.0 g/10 minutes, further preferably 1.2 g/10 minutes. When the MFR is greater than or equal to 0.6 g/10 minutes, miscibility between the polypropylene and the polyethylene resin is improved, and whitening of the film is less likely to occur.

An upper limit of the melt flow rate of the polypropylene resin is preferably 3.0 g/10 minutes, more preferably 2.0 g/10 minutes, further preferably 1.7 g/10 minutes. When the melt flow rate of the polypropylene resin is less than or equal to 3.0 g/10 minutes, the polypropylene is difficult to be perfectly miscible with the polyethylene resin, and bumps and dips are likely to appear on the superficial face of the sealing layer.

A lower limit of the adding amount of the polypropylene resin, relative to the entire mixture with the polyethylene resin is preferably 3% by weight, more preferably 8% by weight, further preferably 10% by weight. When the adding amount is greater than or equal to 3% by weight, blocking is less likely to occur, and the slipperiness directly after unwinding is easy to be obtained. An upper limit of the adding amount of the polypropylene resin in the sealing layer is preferably 25% by weight, more preferably 15% by weight, and the low-temperature sealing property is excellent when the adding amount is less than or equal to 25% by weight.

In the present invention, an anti-blocking agent may be contained. While the anti-blocking agent may be one kind, using a mixture of two or more kinds of inorganic particles having different particle sizes and forms makes it possible to form complicated projections in the bumps and dips of the film surface, and to obtain a higher blocking preventing effect.

In the present invention, it is preferred to add inorganic particles as the anti-blocking agent. By this, it is possible to maintain the low-temperature sealing property, and give a high blocking preventing effect. This is ascribable to that mixing the inorganic particles results in formation of projections on the film surface to reduce the contact area of the film, and thus the blocking preventing effect is obtained.

In the present invention, while the composition and the combination of the inorganic particles to be used as the anti-blocking agent are not limited, silica, zeolite, diatomite, talc and the like can be used. Preferably, a mixture of silica and zeolite can be used. Further, those having non-porous surface and narrow particle size distribution are preferred. This is because when the surface is non-porous, the appearance of the film is maintained because the water is less likely to be adsorbed to the inorganic particles and the film is less likely to undergo foaming.

For the purpose of complicating the surface form, those having different particle sizes can be used to make them play respective roles. When the particle size distribution is narrow, the inorganic particles are less likely to build up on the lip part of the T die, and the productivity can be improved in production of the film.

A lower limit of the particle size of the anti-blocking agent is preferably 3 μm. When the particle size of the anti-blocking agent is greater than or equal to 3 μm, blocking is reduced more easily.

An upper limit of the particle size of the anti-blocking agent is preferably 20 μm, more preferably 16 μm. When the particle size of the anti-blocking agent is less than or equal to 20 μm, the transparency of the film is maintained more easily.

A lower limit of the total concentration of anti-blocking agents is preferably 0.1% by weight, more preferably 0.5% by weight, further preferably 0.8% by weight. When the total concentration of anti-blocking agents is greater than or equal to 0.1% by weight, slipperiness is obtained more easily.

An upper limit of the total concentration of anti-blocking agents is preferably 5% by weight, more preferably 3% by weight, further preferably 2% by weight. When the total concentration of anti-blocking agents is less than or equal to 5% by weight, excessive slipping does not occur, and wincing misalignment is less likely to be caused.

As the polyethylene resin to be used in the intermediate layer (B layer) and the laminating layer (C layer), for example, one or a mixture of two or more kinds selected from ethylene•α-olefin copolymers, and high-pressure-processed polyethylenes can be recited. The ethylene•α-olefin copolymer is a copolymer of ethylene and an α-olefin having 4 to 18 carbons. Examples of α-olefin include butene-1, hexene-1, 4-methylpentene-1, octene-1, and decene-1. The films obtained from these polyethylene resins have excellent heat sealing strength, hot tack property, foreign matter sealing property, and impact resistance, and the polyethylene resin may be mixed with other resin such as ethylene•vinyl acetate copolymer, ethylene•acrylate ester copolymer and the like as long as these properties are not hindered.

The role of the laminating layer (C layer) is to have sufficient adhesive power when it is bonded together with a base material film such as a biaxially oriented polyester film.

The role of the intermediate layer (B layer) is to have such stiffness and breakage resistance that do not hinder the handleability when the film laminated with a base material is processed into a bag, and the bag is filled with the content and used.

A lower limit of the ratio of the sealing layer (A layer) to the thickness of the entire film in the film of the present invention is preferably 10%, more preferably 15%, more preferably 18%. When the ratio of the sealing layer is greater than or equal to 10%, the sealing strength is sufficient.

An upper limit of the ratio of the sealing layer is preferably 40%, more preferably 30%, further preferably 25%. When the ratio of the sealing layer is less than or equal to 40%, the cost is not high.

A lower limit of the ratio of the laminating layer (C layer) to the thickness of the entire film in the film of the present invention is preferably 5%, more preferably 16%. When the ratio of the laminating layer is greater than or equal to 5%, the anti-blocking agent added to the sealing layer and the intermediate layer will not push up the laminating layer, and air foams are less likely to arise on the bonding interface with the base material film. An upper limit of the ratio of the laminating layer is preferably 50%, more preferably 32%. When the ratio of the laminating layer is less than or equal to 50%, the film is not too stiff and is easy to process.

In this case, it is preferred that the mean density of the polyethylene resin of each layer of the film satisfies sealing layer (A layer)≤intermediate layer (B layer)≤laminating layer (C layer). Since the mixed organic lubricant is difficult to migrate to the layer having a higher density, it is effective for maintaining the slipperiness after lamination.

A lower limit of the density of the intermediate layer (B layer) of the film of the present invention is preferably 920 kg/m$^3$, more preferably 925 kg/m$^3$, further preferably 930 kg/m$^3$. When the density of the intermediate layer is greater than or equal to 920 kg/m$^3$, the film is stiff, and is easy to process.

An upper limit of the density of the intermediate layer (B layer) is preferably 960 kg/m$^3$, more preferably 940 kg/m$^3$, further preferably 935 kg/m$^3$.

In the intermediate layer (B layer) of the film of the present invention, the aforementioned organic lubricant may be used, and a lower limit of the organic lubricant is preferably 600 ppm by weight, more preferably 800 ppm by weight. When the organic lubricant is greater than or equal to 600 ppm by weight, slipperiness is easy to be obtained.

An upper limit of the concentration of the organic lubricant such as erucic amide in the intermediate layer is preferably 2000 ppm by weight, more preferably 1500 ppm by weight. When the organic lubricant is greater than or equal to 2000 ppm by weight, excessive slipping does not occur, and winding misalignment is less likely to be caused.

The intermediate layer (B layer) of the film of the present invention may contain 10 to 30% by mass of a recovery resin.

In the present invention, it is preferred to conduct an active ray treatment such as a corona treatment on the aforementioned laminating layer (C layer) face of the polyethylene film. This improves the laminate strength.

A lower limit of the wetting tension of the laminating layer (C layer) of the film of the present invention is preferably 30 N, more preferably 40 N. When the wetting tension is greater than or equal to 30 N, sufficient laminate strength is easy to be obtained when the film is bonded with a base material such as a biaxially oriented nylon (ONy) film, a biaxially oriented polyethylene terephthalate (PET) film, a biaxially oriented polypropylene (OPP) film or the like.

An upper limit of the wetting tension is preferably 55 N, more preferably 50 N. When the wetting tension is less than or equal to 55 N, the amount of migration of the organic lubricant to the laminating layer (C layer) surface is not large, and the laminate adhesion strength is maintained more easily.

The film having projections of different heights on the film surface is superior in blocking resistance to the film having projections of the same height on the film surface. The aforementioned inorganic particles may be contained in the laminating layer (C layer) or the intermediate layer (B layer) as is necessary.

(Film Characteristics)

The upper limit of the blocking strength is preferably 60 MN/20 mm, more preferably 50 mN/20 mm, further preferably 40 mN/20 mm. When the blocking strength is less than or equal to 60 mN/20 mm, the slipperiness directly after unwinding is easy to be excellent.

A lower limit of the haze of the polyethylene film of the present invention is preferably 3%, more preferably 5%, further preferably 7%. When the haze is greater than or equal to 3%, blocking is less likely to occur.

An upper limit of the haze is preferably 15%, more preferably 12%, further preferably 10%. When the haze is less than or equal to 15%, the content is easy to view.

A lower limit of the sealing strength of the film as itself of the polyethylene film of the present invention is preferably 5 N/15 mm, more preferably 6 N/15 mm. When the sealing strength is greater than or equal to 5 N/15 mm, the breakage of the bag is less likely to occur after producing the bag.

An upper limit of the sealing strength of the film as itself is preferably 12 N/15 mm, more preferably 10 N/15 mm. When the sealing strength is less than or equal to 12 N/15 mm, the bag is easy to be open after producing the bag.

A lower limit of the heat seal starting temperature of the film formed by laminating the polyethylene film of the present invention with PET is preferably 90° C., more preferably 100° C. When the heat seal starting temperature is greater than or equal to 90° C., fusion is less likely to occur by the heat other than the heat for sealing.

An upper limit of the heat seal starting temperature is preferably 120° C., more preferably 115° C. When it is less than or equal to 120° C. the heat required for sealing is not great.

The heat seal starting temperature refers to the lowest temperature at which the heat sealing strength is 4.9 N/15 mm when the heat seal temperature is sequentially elevated from 80° C.

A lower limit of the heat sealing strength at 120° C. of the film laminated with a PET film is preferably 30 N/15 mm, more preferably 35 N/15 mm. When the heat sealing strength is greater than or equal to 30 N/15 mm, the bag is less likely to break after producing the bag.

An upper limit of the heat sealing strength at 120° C. of the film laminated with a PET film is 60 N/15 mm, more preferably 50 N/15 mm. When the heat sealing strength is less than or equal to 60 N/15 mm, the bag is easy to be open after producing the bag.

A lower limit of the coefficient of static friction of the polyethylene film as itself of the present invention is preferably 0.05, more preferably 0.08. When the coefficient of static friction is greater than or equal to 0.05, the film is not too slippery in winding, and winding misalignment is less likely to be caused.

An upper limit of the coefficient of static friction of the polyethylene film as itself is preferably 0.20, more preferably 0.15, further preferably 0.10. When the coefficient of static friction is less than or equal to 0.20, the loss at the time of processing is reduced.

A lower limit of the coefficient of static friction measured directly after unwinding of the polyethylene film of the present invention is preferably 0.05, more preferably 0.08. When the coefficient of static friction measured directly after unwinding is less than or equal to 0.05, the film is not too slippery in winding, and winding misalignment is less likely to be caused.

An upper limit of the coefficient of static friction measured directly after unwinding is preferably 0.25, more preferably 0.18, further preferably 0.10. When the coefficient of static friction measured directly after unwinding is less than or equal to 0.25, the loss at the time of processing is reduced.

A lower limit of the coefficient of static friction after lamination of the polyethylene film of the present invention is preferably 0.05, more preferably 0.08. When the coefficient of static friction after lamination is greater than or equal to 0.05, the film is not too slippery in winding, and winding misalignment is less likely to be caused.

An upper limit of the coefficient of static friction after lamination is preferably 0.20, more preferably 0.15. When the coefficient of static friction after lamination is less than or equal to 0.20, the opening property after producing the bag is excellent and, the loss at the time of processing is small.

A lower limit of the Young's modulus (MD) of the polyethylene film of the present invention is preferably 100 MPa, more preferably 200 MPa. When the Young's modulus (MD) is greater than or equal to 100 MPa, the stiffness is not too weak, and the processability is excellent. An upper limit of the Young's modulus (MD) is preferably 800 MPa, more preferably 600 MPa.

A lower limit of the Young's modulus (TD) of the polyethylene film of the present invention is preferably 100 MPa, more preferably 200 MPa. When the Young's modulus (TD) is greater than or equal to 100 MPa, the stiffness is not too weak, and the processability is excellent.

An upper limit of the Young's modulus (TD) is preferably 1000 MPa, more preferably 600 MPa.

EXAMPLES

Hereinafter, the present invention will be specifically described by examples, however it is to be noted that the present invention is not limited to these examples. Characteristics obtained in each example were determined and evaluated by the following methods.

(1) Resin Density

Density was evaluated in accordance with JIS K7112 (1999).

(2) Melt Flow Rate (MFR)

Measurement was conducted at 230° C., with a load of 21.18 N on the basis of ASTM D-1238.

(3) Arithmetic Mean Inclination Angle (RΔa (MD) [°]) and Arithmetic Mean Inclination Angle (RΔa (TD) [°])

First, an image was taken in any selected site on the sealing layer (A layer) side of the film using a profile measuring laser microscope (model VK-9700 available from KEYENCE CORPORATION) (magnification: 50 times).

Then the image was measured for surface roughness (line roughness) using roughness analyzing software (VK Analyzer, available from KEYENCE CORPORATION).

The surface roughness (line roughness) was measured on the basis of JIS-B0601, with a cutoff of λc=0.08 mm, an analyzing length in the MD direction of 200 μm, an analyzing interval in the TD direction of 3.3 μm, and n=60. For each surface roughness (line roughness) curve, an arithmetic mean inclination angle was calculated according to the JISB0601:2001 method at a measurement pitch of 0.01 μm, and the mean was determined as an arithmetic mean inclination angle (RΔa (MD) [°]).

Also, an arithmetic mean inclination angle (RΔa (TD) [°]) was measured in the same manner with an analyzing length in the TD direction of 200 μm, and an analyzing interval in the MD direction of 3.3 μm.

(4) Blocking Strength of Film

The method for measuring blocking strength is as follows. A sample 1 was formed by overlapping the laminating layer (C layer) of the film and the sealing layer (A layer) of the film with each other, sample 1 that was cut into a size of 150 mm in the machine direction of film and 20 mm in the direction perpendicular to the machine direction was sandwiched by clean glass plates of 160 mm long and 30 mm wide, and a load of 20 kg was applied from above and left to stand for 20 hours in an atmosphere at 60° C. Then the load and the glass plates were removed, and the sample was left to stand for 1 hour in an atmosphere at 23 degrees, 65% Rh. As shown in FIG. 1, overlapped layers of the laminate film were separated 30 mm in the machine direction, and an aluminum bar 2 of φ5 mm and 50 mm long was inserted between the separated layers. The aluminum bar was pulled in the machine direction of film at 100 mm/minute by an autograph (AG-I) 3 available from Shimadzu Corporation, and a load at that time was measured.

(5) Unwindability from Film Roll (Evaluation of Blocking)

⊙: Unwindable with no resistance

○: Sound of peeling films off is heard in unwinding x: There is resistance in unwinding (6) Coefficient of Static Friction of Film Films were overlapped with respective sealing layers (A layer) facing each other, and measurement was conducted in accordance with JIS K7125 by using a universal tensile machine STM-T-50BP (available from TOYO BALDWIN). A sample was cut into a size of 200 mm in the MD direction and 80 mm in the TD direction, and measured by the following three ways.

(Directly after Unwinding)

In the case of measuring a coefficient of static friction after a lapse of 30 minutes from unwinding from the roll-like film obtained in example or comparative example, a sample was collected in the part appearing by unwinding 5 m or more from the superficial face of the roll-like film. Using the film of the outermost layer can result in incorrect measurement because of the weak adhesion between the films during storage.

(Normal)

Measurement was conducted between the sealing layer (A layer) sides in the condition that the organic lubricant bled out on the film surface after a lapse of 40 minutes from collection of the sample.

(After PET Film Lamination)

Measurement was conducted for the dry laminate film obtained in example or comparative example in the condition that sealing layer (A layer) sides were overlapped with each other.

(7) Three-Dimensional Surface Roughness (SRa)

A three-dimensional surface roughness (SRa) was determined by measuring surface roughness of a part of a measurement surface of 1 mm×0.2 mm arbitrarily selected from a film piece of 3 cm×3 cm square by using a contact type surface roughness (Model ET4000A, available from Kosaka Laboratory Ltd.).

(8) Heat Sealing Strength

Heat sealing conditions and strength measurement conditions are as follows. Specifically, polyethylene films of the laminate film obtained in example or comparative example were overlapped with each other, and heat-sealed at a pressure of 0.1 MPa for 1 second, with a width of the sealing bar of 10 mm, at a heat sealing temperature of 120° C., and then allowed to cool at 23° C. From the film that was heat-sealed at 120° C., a test piece of 15 mm wide and 70 mm long was cut out in the direction perpendicular to the direction of the heat sealing bar, and for each test piece, a peeling strength was measured when the heat-sealed part was peeled off at a cross head speed of 200 mm/minute.

(9) Heat Seal Starting Temperature

The heat seal starting temperature was determined as the lowest temperature at which the heat sealing strength reaches 4.9 N/15 mm when the heat sealing temperature was sequentially elevated from 80° C. in conducting measurement of the heat sealing strength by the method of the above (8).

(10) Haze

Haze was measured by using a haze meter NDH3000 (available from NIPPON DENSHOKU INDUSTRIES Co., LTD.) in accordance with JIS K7136.

Example 1

(Preparation of Sealant Film)
(Polyethylene Composition of Sealing Layer (A Layer))

To 90% by weight of a polyethylene resin (ELITE (registered trade name) 5220G, available from Dow Chemical Company) having a resin density of 915 kg/m$^3$ and an MFR of 3.5 g/10 minutes, 10% by weight of a polypropylene resin (Noblen (registered trade name) S131, available from SUMITOMO CHEMICAL COMPANY, LIMITED) having a resin density of 890 kg/m$^3$ and an MFR of 1.4 g/10 minutes was mixed. As an anti-blocking agent, 1.17% by weight of noncrystalline silica having a mean particle size of 10 μm and 0.49% by weight of zeolite having a mean particle size of 4 μm were added to a total amount of the resin, and 1000 ppm of erucic amide was added as an organic lubricant. Additives were mixed as a master batch of each polyethylene resin.

(Polyethylene Composition of Intermediate Layer (B Layer))

A 68% by weight of a polyethylene resin (SUMIKATHENE (registered trade name) FV407, available from SUMITOMO CHEMICAL COMPANY, LIMITED) having a resin density of 930 kg/m$^3$, 12% by weight of a polyethylene resin available from Prime Polymer Co., Ltd. (MORETEC (registered trade name) 0408G) having a resin density of 962 kg/m$^3$, and 20% by weight of a recovery material were mixed. As an organic lubricant, 1000 ppm of erucic amide was added. Additives were mixed as a master batch of the polyethylene resin.

(Polyethylene Composition of Laminating Layer (C Layer))

To 80% by weight of a polyethylene resin (FV407, available from SUMITOMO CHEMICAL COMPANY, LIMITED) having a resin density of 930 kg/m$^3$, 20% by weight of a polyethylene resin (MORETEC (registered trade name) 0408G, available from rime Polymer Co., Ltd.) having a resin density of 962 kg/m$^3$ and a molecular weight distribution of 2.8 was mixed.

Using a three-stage uniaxial extruder having a screw diameter of 90 mm for a polyethylene resin composition for B layer, and three-stage uniaxial extruders having a diameter of 45 mm and a diameter of 60 mm respectively for polyethylene resin compositions for A layer and C layer, the compositions were introduced, in the order of A layer/B layer/C layer, into a three-layer type T slot die that is so designed that flow of the molten resin in the die is uniform by setting a preland in two stages with a width of 800 mm, and curving the shape of the step part, and the compositions were extruded at an outlet temperature of die of 218° C. The lip gap was set at 1.6 mm. The molten resin sheet exiting the die was cooled with a cooling roll at 38° C., to obtain a polyethylene laminate film having a configuration of A layer/B layer/C layer and layer thicknesses of 8/21/8 (μm).

The silo and the hopper for supply to the extruder were also replaced with nitrogen gas. For cooling with the cooling roll, both ends of the film on the cooling roll were fixed by an air nozzle, and the entire width of the molten resin sheet was pushed against the cooling roll by an air knife, and at the same time, the vacuum chamber was effected to prevent entrainment of air into between the melt resin sheet and the cooling roll. The air nozzle was installed on both ends in the direction of travel of the film. The wind direction of the air knife was set at 40 degrees with respect to the direction of travel of the extruded sheet.

The direction of the suction port of the vacuum chamber was aligned with the direction of travel of the extruded sheet. Further, the circumference of the die was surrounded by a sheet so as to prevent the wind from hitting on the molten resin sheet. A corona treatment was conducted on the superficial face of the C layer. The film production was conducted at a speed of 21 m/minute. The produced film was wound into a roll state after its ear part was trimmed. The film configuration is shown in Table 1, and the result of physical properties of the obtained film is shown in Table 2.

(Preparation of Dry Laminate Film)

A film according to the present invention and a base material film (biaxially oriented polyester film, E5100, available from TOYOBO, thickness 12 μm) were dry-laminated by using an ester adhesive obtained by mixing 32.4 parts by mass of an ester adhesive for dry lamination (LX500, available from DIC Graphics Corporation), 2.2 parts by mass of a hardening agent (KR90S, available from DIC Graphics Corporation), and 65.4 parts by mass of ethyl acetate so that the applied amount of the adhesive was 3.0 g/m$^2$. The laminated laminate film was kept at 40° C. and aged for three days to obtain a dry laminate film. The result of physical properties of the obtained laminate film is shown in Table 2.

Example 2

A sealant film was obtained in the same manner as in Example 1 except that the mixing ratio between the polypropylene resin and the polyethylene resin in the sealing layer (A layer) was changed to 15% by weight for the polypropylene resin and 85% by weight for the polyethylene resin.

Reference Example 3

A sealant film was obtained in the same manner as in Example 1 except that the mixing ratio between the polypropylene resin and the polyethylene resin in the sealing layer (A layer) was changed to 3% by weight for the polypropylene resin and 97% by weight for the polyethylene resin.

Example 4

A sealant film was obtained in the same manner as in Example 1 except that the concentration of erucic amide to be added to the sealing layer (A layer) was changed to 800 ppm.

Example 5

A sealant film was obtained in the same manner as in Example 1 except that the thicknesses of sealing layer (A layer)/intermediate layer (B layer)/laminating layer (C layer) were changed to 6.5/17.0/6.5 μm (30 μm in total).

Example 6

A sealant film was obtained in the same manner as in Example 1 except that the concentration of silica to be added to the sealing layer (A layer) was changed to 0.58% by weight.

Example 7

A sealant film was obtained in the same manner as in Example 1 except that the concentration of zeolite to be added to the sealing layer (A layer) was changed to 0.25% by weight.

Example 8

A sealant film was obtained in the same manner as in Example 1 except that the mixing ratio between the polypropylene resin and the polyethylene resin in the sealing layer (A layer) was changed to 3% by weight for the polypropylene resin and 97% by weight for the polyethylene resin, and silica was not added to the sealing layer (A layer).

In any film of Examples 1 to 8, blocking was suppressed in unwinding from the film roll, and the bag producing process could be conducted smoothly. The seal-opening property after bag production was excellent, and packing of foods could be conducted smoothly.

Comparative Example 1

A sealant film was obtained in the same manner as in Example 1 except that a polypropylene resin was not added to the sealing layer (A layer), and the polyethylene resin was 100% by weight. The bumps and dips in the film were reduced, and the slipperiness directly after unwinding was not obtained.

Comparative Example 2

A sealant film was obtained in the same manner as in Example 1 except that the mixing ratio between the polypropylene resin and the polyethylene resin in the sealing layer (A) was changed to 30% by weight for the polypropylene resin and 70% by weight for the polyethylene resin. However, as a result, the sealing strength was impaired.

Comparative Example 3

A sealant film was obtained in the same manner as in Example 1 except that in place of the polypropylene resin (Noblen S131, available from SUMITOMO CHEMICAL COMPANY, LIMITED) used in the sealing layer (A), a polypropylene resin prepared by melting a polypropylene resin (Noblen S131, available from SUMITOMO CHEMICAL COMPANY, LIMITED) at 220° C., followed by re-pelleting, and thus having an elevated melt flow rate (MFR) of 3.2 g/10 minutes was used.

However, the polypropylene resin was perfectly miscible with the polyethylene resin, and the bumps and dips of the film were reduced, and the slipperiness directly after unwinding could not be obtained.

Comparative Example 4

A sealant film was tried to obtain in the same manner as in Example 1 except that the polypropylene resin (Noblen S131, available from SUMITOMO CHEMICAL COMPANY, LIMITED) used in the sealing layer (A) was changed to a polypropylene resin (Noblen D101, available from SUMITOMO CHEMICAL COMPANY, LIMITED, resin density 900 kg/m$^3$, MFR 0.5 g/10 minutes).

However, the polypropylene resin was not miscible at all with the polyethylene resin, and a film could not be obtained.

TABLE 1

| | | Example 1 | Example 2 | Reference Example 3 | Example 4 |
|---|---|---|---|---|---|
| Polyethylene resin in sealing layer | Resin density [kg · cm$^3$] | 915 | 915 | 915 | 915 |
| | MFR [g/10 minutes] | 3.5 | 3.5 | 3.5 | 3.5 |
| Compounds other than polyethylene resin in sealing layer | MFR of PP [g/10 minutes] | 1.4 | 1.4 | 1.4 | 1.4 |
| | PP adding amount [% by weight] | 10 | 15 | 3 | 10 |
| | Organic lubricant concentration [% by weight] | 1000 | 1000 | 1000 | 800 |
| | Silica [% by weight] | 1.15 | 1.15 | 1.15 | 1.15 |
| | Zeolite [% by weight] | 0.5 | 0.5 | 0.5 | 0.5 |
| | Total [% by weight] | 1.65 | 1.65 | 1.65 | 165 |
| Film configuration and density | Sealing layer (A layer) [kg/cm$^3$] | 912 | 912 | 912 | 912 |
| | Intermediate layer (B layer) [kg/cm$^3$] | 934 | 934 | 934 | 934 |
| | Laminating layer (C layer) [kg/cm$^3$] | 937 | 937 | 937 | 937 |
| Thickness of film | Sealing layer (A layer) [μm] | 8 | 8 | 8 | 8 |
| | Intermediate layer (B layer) [μm] | 21 | 21 | 21 | 21 |
| | Laminating layer (C layer) [μm] | 8 | 8 | 8 | 8 |

TABLE 1-continued

|  |  | Example 5 | Example 6 | Example 7 | Example 8 |
|---|---|---|---|---|---|
| Polyethylene resin in sealing layer | Resin density [kg · cm³] | 915 | 915 | 915 | 915 |
|  | MFR [g/10 minutes] | 3.5 | 3.5 | 3.5 | 3.5 |
| Compounds other than polyethylene resin in sealing layer | MFR of PP [g/10 minutes] | 1.4 | 1.4 | 1.4 | 1.4 |
|  | PP adding amount [% by weight] | 10 | 10 | 10 | 3 |
|  | Organic lubricant concentration [% by weight] | 1000 | 1000 | 1000 | 1000 |
|  | Silica [% by weight] | 1.15 | 0.5 | 1.15 | 0 |
|  | Zeolite [% by weight] | 0.5 | 0.5 | 0.2 | 0.5 |
|  | Total [% by weight] | 1.65 | 1.0 | 1.35 | 0.5 |
| Film configuration and density | Sealing layer (A layer) [kg/cm³] | 912 | 912 | 912 | 912 |
|  | Intermediate layer (B layer) [kg/cm³] | 934 | 934 | 934 | 934 |
|  | Laminating layer (C layer) [kg/cm³] | 937 | 937 | 937 | 937 |
| Thickness of film | Sealing layer (A layer) [μm] | 6.5 | 8 | 8 | 8 |
|  | Intermediate layer (B layer) [μm] | 17 | 21 | 21 | 21 |
|  | Laminating layer (C layer) [μm] | 6.5 | 8 | 8 | 8 |

TABLE 2

|  |  | Example 1 | Example 2 | Reference Example 3 | Example 4 |
|---|---|---|---|---|---|
| Arithmetic mean inclination angle | RΔa (MD) [°] | 0.54 | 0.39 | 0.82 | 0.62 |
|  | RΔa (TD) [°] | 1.12 | 0.92 | 1.04 | 1.23 |
|  | RΔa (TD)/RΔa(MD)[−] | 2.1 | 2.4 | 1.3 | 2.0 |
| Blocking strength between sealing layer (A) and laminating layer (C) | [mN/20 mm] | 23 | 18 | 32 | 28 |
| Evaluation of blocking in unwinding of film | Three-grade evaluation [⊚, ○, X] | ⊚ | ⊚ | ○ | ○ |
| Coefficient of static friction between sealing layers (A layers) | After PET lamination [−] | 0.11 | 0.11 | 0.14 | 0.14 |
|  | Normal measurement [−] | 0.08 | 0.08 | 0.1 | 0.12 |
|  | Directly after unwinding [−] | 0.11 | 0.11 | 0.14 | 0.13 |
| Three-dimensional surface roughness | SRa (sealing layer) [μm] | 0.11 | 0.16 | 0.90 | 0.14 |
| Heat seal starting temperature (greater than or equal to 4.9N/15 mm) | After PET lamination [° C.] | 108 | 109 | 108 | 108 |
| Heat sealing strength (120° C.) | After sealing of PET laminate [N/15 mm] | 36.7 | 30.2 | 39.4 | 37.1 |
| Haze | [%] | 8.1 | 8.7 | 7.8 | 8.2 |

|  |  | Example 5 | Example 6 | Example 7 | Example 8 |
|---|---|---|---|---|---|
| Arithmetic mean inclination angle | RΔa (MD) [°] | 0.61 | 0.46 | 0.42 | 0.61 |
|  | RΔa (TD) [°] | 1.32 | 0.91 | 0.78 | 0.79 |
|  | RΔa (TD)/RΔa(MD)[−] | 2.2 | 2.0 | 1.9 | 1.3 |
| Blocking strength between sealing layer (A) and laminating layer (C) | [mN/20 mm] | 25 | 35 | 25 | 34 |
| Evaluation of blocking in unwinding of film | Three-grade evaluation [⊚, ○, X] | ○ | ○ | ○ | ○ |
| Coefficient of static friction between sealing layers (A layers) | After PET lamination [−] | 0.15 | 0.14 | 0.14 | 0.13 |
|  | Normal measurement [−] | 0.09 | 0.13 | 0.13 | 0.16 |
|  | Directly after unwinding [−] | 0.13 | 0.13 | 0.14 | 0.16 |
| Three-dimensional surface roughness | SRa (sealing layer) [μm] | 0.10 | 0.10 | 0.11 | 0.06 |
| Heat seal starting temperature (greater than or equal to 4.9N/15 mm) | After PET lamination [° C.] | 105 | 108 | 108 | 108 |
| Heat sealing strength (120° C.) | After sealing of PET laminate [N/15 mm] | 35.8 | 36.5 | 36.8 | 39.1 |
| Haze | [%] | 7.8 | 7.4 | 7.6 | 5.5 |

TABLE 3

| | | Comparative Example 1 | Comparative Example 2 | Comparative Example 3 | Comparative Example 4 |
|---|---|---|---|---|---|
| Polyethylene resin in sealing layer | Resin density [kg · cm³] | 915 | 915 | 915 | 915 |
| | MFR [g/10 minutes] | 3.5 | 3.5 | 3.5 | 3.5 |
| Compounds other than polyethylene resin in sealing layer | MFR of PP [g/10 minutes] | — | 1.4 | 3.2 | 0.5 |
| | PP adding amount [% by weight] | 0 | 30 | 15 | 10 |
| | Organic lubricant concentration [% by weight] | 1000 | 1000 | 1000 | 1000 |
| | Silica [% by weight] | 1.15 | 1.15 | 1.15 | 1.15 |
| | Zeolite [% by weight] | 0.5 | 0.5 | 0.5 | 0.5 |
| | Total [% by weight] | 1.65 | 1.65 | 1.65 | 1.65 |
| Film configuration and density | Sealing layer (A layer) [kg/cm³] | 915 | 907 | 907 | 912 |
| | Intermediate layer (B layer) [kg/cm³] | 934 | 934 | 934 | 934 |
| | Laminating layer (C layer) [kg/cm³] | 937 | 937 | 937 | 937 |
| Thickness of film | Sealing layer (A layer) [μm] | 8 | 8 | 8 | 8 |
| | Intermediate layer (B layer) [μm] | 21 | 21 | 21 | 21 |
| | Laminating layer (C layer) [μm] | 8 | 8 | 8 | 8 |

TABLE 4

| | | Comparative Example 1 | Comparative Example 2 | Comparative Example 3 | Comparative Example 4 |
|---|---|---|---|---|---|
| Arithmetic mean inclination angle | RΔa (MD)[°] | 0.42 | 0.53 | 0.93 | — |
| | RΔa (TD) [°] | 0.43 | 2.02 | 1.03 | — |
| | RΔa (TD)/RΔa(MD)[−] | 1.0 | 3.9 | 1.1 | — |
| Blocking strength between sealing layer (A) and laminating layer (C) | [mN/20 mm] | 41 | 21 | 44 | — |
| Evaluation of blocking in unwinding of film | Three-grade evaluation [◎, ○, X] | X | ○ | X | — |
| Coefficient of static friction between sealing layers | After PET lamination [−] | 0.13 | 0.12 | 0.17 | — |
| | Normal measurement [−] | 0.11 | 0.09 | 0.12 | — |
| | Directly after unwinding [−] | 0.36 | 0.1 | 0.28 | — |
| Three-dimensional surface roughness | SRa (sealine layer) [μm] | 0.09 | 0.17 | 0.08 | — |
| Heat seal starting temperature (greater than or equal to 4.9N/15 mm) | After PET lamination [° C.] | 99 | 113 | 109 | — |
| Heat sealing strength (120° C.) | After sealing of PET laminate [N/15 mm] | 41.1 | 23.2 | 40.5 | — |
| Haze | [%] | 7.2 | 12.5 | 5.5 | — |

INDUSTRIAL APPLICABILITY

Since the blocking resistance in unwinding from the film roll state, and the blocking resistance between sealants after lamination with a base material are improved, the loss in processing can be reduced, and industrially great contribution can be made.

The invention claimed is:

1. A polyethylene film wherein in at least either face, a ratio between an arithmetic mean inclination angle in a machine direction of film (RΔa (MD) [°]), and an arithmetic mean inclination angle in a direction perpendicular to the machine direction (RΔa (TD) [°]) satisfies the following formula (1):

$$1.2 \leq R\Delta a(TD)/R\Delta a(MD) \leq 3.6 \quad (1)$$

RΔa (MD) is an arithmetic mean inclination angle measured in the machine direction of film, RΔa (TD) is an arithmetic mean inclination angle measured in the direction perpendicular to the machine direction of film, and wherein a three-dimensional arithmetic mean roughness SRa of the film surface satisfying the formula (1) is greater than or equal to 0.05 μm and less than or equal to 0.25 μm.

2. The polyethylene film according to claim 1, wherein a layer having the face satisfying the formula (1) contains 75 to 97% by weight of a polyethylene resin, and 25 to 3% by weight of a polypropylene resin.

3. The polyethylene film according to claim 2, wherein said polyethylene resin is a linear low density polyethylene.

4. The polyethylene film according to claim 2, wherein a melt flow rate (MFR) measured in ASTM D-1238 (230° C., 21.18 N) of said polypropylene resin is 0.6 to 3.0 g/10 minutes.

5. The polyethylene film according to claim 1, wherein a heat sealing strength after heat sealing at 120° C. is greater than or equal to 25 N/15 mm.

6. The polyethylene film according to claim 1, wherein a blocking strength is less than or equal to 60 mN/20 mm.

7. The polyethylene film according to claim 1, wherein the RΔa (MD) is 0.2 to 0.9 and the RΔa (TD) is 0.6 to 1.4.

8. The polyethylene film according to claim 1, wherein the RΔa (MD) is 0.4 to 0.7 and the RΔa (TD) is 0.8 to 1.2.

9. A polyethylene film comprising at least three layers: a sealing layer (A layer), an intermediate layer (B layer), and a laminating layer (C layer), wherein a ratio between an arithmetic mean inclination angle in a machine direction of film (RΔa (MD) [°]), and an arithmetic mean inclination angle in a direction perpendicular to the machine direction (RΔa (TD) [°]) of a face of A layer satisfies the following formula (1):

$$1.2 \leq R\Delta a(TD)/R\Delta a(MD) \leq 3.6 \qquad (1)$$

RΔa (MD) is an arithmetic mean inclination angle measured in the machine direction of film, RΔa (TD) is an arithmetic mean inclination angle measured in the direction perpendicular to the machine direction of film, and wherein a three-dimensional arithmetic mean roughness SRa of the film surface satisfying the formula (1) is greater than or equal to 0.05 μm and less than or equal to 0.25 μm.

10. The polyethylene film according to claim 9, wherein the RΔa (MD) is 0.2 to 0.9 and the RΔa (TD) is 0.6 to 1.4.

11. The polyethylene film according to claim 9, wherein the RΔa (MD) is 0.4 to 0.7 and the RΔa (TD) is 0.8 to 1.2.

12. The polyethylene film according to claim 9, wherein a layer having the face satisfying the formula (1) contains 75 to 97% by weight of a polyethylene resin, and 25 to 3% by weight of a polypropylene resin.

13. The polyethylene film according to claim 12, wherein said polyethylene resin is a linear low density polyethylene.

14. The polyethylene film according to claim 12, wherein a melt flow rate (MFR) measured in ASTM D-1238 (230° C., 21.18 N) of said polypropylene resin is 0.6 to 3.0 g/10 minutes.

15. The polyethylene film according to claim 9, wherein a heat sealing strength after heat sealing at 120° C. is greater than or equal to 25 N/15 mm.

16. The polyethylene film according to claim 9, wherein a blocking strength is less than or equal to 60 mN/20 mm.

* * * * *